United States Patent
Casey et al.

(10) Patent No.: US 9,458,960 B2
(45) Date of Patent: *Oct. 4, 2016

(54) METHOD OF USING GELLED FLUIDS WITH DEFINED SPECIFIC GRAVITY

(71) Applicants: Gregory E. Casey, Humble, TX (US);
Angel Hoover, Tomball, TX (US);
Andrew J. Barden, Bellaire, TX (US)

(72) Inventors: Gregory E. Casey, Humble, TX (US);
Angel Hoover, Tomball, TX (US);
Andrew J. Barden, Bellaire, TX (US)

(73) Assignee: Baker Hughes Incorporated, Houston, TX (US)

(*) Notice: Subject to any disclaimer, the term of this patent is extended or adjusted under 35 U.S.C. 154(b) by 639 days.

This patent is subject to a terminal disclaimer.

(21) Appl. No.: 13/826,278

(22) Filed: Mar. 14, 2013

(65) Prior Publication Data

US 2014/0262348 A1  Sep. 18, 2014

Related U.S. Application Data

(63) Continuation of application No. 12/954,413, filed on Nov. 24, 2010, now Pat. No. 8,418,762.

(51) Int. Cl.
*E21B 33/12* (2006.01)
*F16L 55/11* (2006.01)
*C09K 8/50* (2006.01)
*C09K 8/42* (2006.01)
*C09K 8/40* (2006.01)

(52) U.S. Cl.
CPC ................ *F16L 55/11* (2013.01); *C09K 8/40* (2013.01); *C09K 8/426* (2013.01); *C09K 8/50* (2013.01); *E21B 33/12* (2013.01); *Y10T 137/0318* (2015.04)

(58) Field of Classification Search
CPC .......... E21B 33/12; C09K 8/50; C09K 8/426; F16L 55/11
USPC .......... 166/386, 272.6, 305.1, 279, 300, 285, 166/292

See application file for complete search history.

(56) References Cited

U.S. PATENT DOCUMENTS

| | | | |
|---|---|---|---|
| 6,302,209 B1 * | 10/2001 | Thompson et al. ....... | 166/305.1 |
| 6,666,664 B2 * | 12/2003 | Gross ........................ | 417/423.3 |
| 2008/0060820 A1 * | 3/2008 | Bour et al. .................. | 166/386 |
| 2008/0093081 A1 * | 4/2008 | Stoisits et al. ............... | 166/366 |
| 2008/0217012 A1 * | 9/2008 | Delorey et al. .............. | 166/300 |

* cited by examiner

Primary Examiner — Doug Hutton, Jr.
Assistant Examiner — Silvana Runyan
(74) Attorney, Agent, or Firm — John Wilson Jones

(57) ABSTRACT

Gelled barrier fluids preventing the ingress of undesired fluids from subsurface environments into subsurface apparatus have a specific gravity which is within ±0.05 of the specific gravity of the undesired fluid.

19 Claims, No Drawings

METHOD OF USING GELLED FLUIDS WITH DEFINED SPECIFIC GRAVITY

This application is a continuation application of U.S. patent application Ser. No. 12/954,413, filed on Nov. 24, 2010.

FIELD OF THE INVENTION

Barrier fluids useful in preventing the ingress of undesired fluids from subsurface environments into subsurface apparatus have a specific gravity which is substantially similar to the specific gravity of the undesired fluid.

BACKGROUND OF THE INVENTION

Thickened fluids or gels, often referred to as isolation gels or gel plugs, have been used for several years to pack subsurface apparatus, such as spools, manifolds and sections of pipe in order to minimize the ingress of fresh water or sea water during assembly or laying of such subsurface apparatus.

Gel plugs often consist of water-based crosslinked viscosifying polymers, such as guar. Gel plugs are characterized by a high loading of viscosifying polymer, typically about 100 pounds per 1000 gallons of base fluid is used. Once the viscosifying polymer is hydrated in water, chemicals are added to adjust the pH and to crosslink the polymer. The crosslinked gel is then placed, pumped or injected into the subsurface apparatus, such as at the end of a pipe section closed by a blind flange. When the pipe sections are transported and eventually placed in their subsurface location, the installation process begins. The blind flange or other pipe and sealing device are removed exposing the end of the pipe to the open environment. The subsurface connection is then made.

At some point, the gelled material is displaced out of the subsurface assembly, either before or during the commissioning of the pipe. Methods have been sought which lessen displacement of the gelled material from the subsurface assembly.

In addition, manufacturers of subsea apparatus composed of such sensitive metals as stainless steel have increasingly demanded that the chloride level of base fluids be less than 50 ppm in light of internal parts and in order to minimize salt corrosion. Exposure of certain alloys to high chloride levels often causes intergranular stress crack corrosion (IGSCC). Alternative gelling materials have been sought which minimize salt corrosion.

SUMMARY OF THE INVENTION

Gelled barrier fluids prevent the ingress of undesired fluids from the environment, into subsurface apparatus. The undesired fluid is typically salt water in a subsea application, but can also be fresh water in a lake or river as well as hydrocarbons in some situations.

The gelled barrier fluid typically has a specific gravity which is ±0.05, preferably ±0.01, most preferably ±0.003, of the specific gravity of the undesired fluid. When the specific gravity of the barrier fluid is substantially equal to the specific gravity of the undesired fluid, the tendency of the gelled fluid to be displaced from the subsurface apparatus dramatically decreases.

The gelled barrier fluid is typically substantially free of gas and may contain a base fluid and a gellant system, wherein the amount of base fluid in the barrier fluid is typically between from about 90 to 99 volume percent. The base fluid may be fresh water, an alcohol or a glycol as well as blends thereof, and such hydrocarbons as diesel.

The specific gravity of the barrier fluid is adjusted to be within ±0.05 of the specific gravity of the unwanted fluid after factoring the specific gravity of the components of the gellant system.

DETAILED DESCRIPTION OF THE PREFERRED EMBODIMENTS

Barrier fluids may be prepared which are useful in preventing the ingress of unwanted (undesired) fluids from subsurface environments into subsurface apparatus. In particular, the barrier fluids defined herein are useful in the prevention of ingress of salt water, fresh water and hydrocarbon based fluids, such as crude oil, into subsurface apparatus. In some instances, the barrier fluid assists in inhibiting hydrate formation.

Subsurface apparatus as used herein shall include, but not be restricted to spools, manifolds [including PipeLine End Terminations (PLET) and PipeLine End Manifolds (PLEM)] and distribution units, pipes, pipelines, control systems including umbilicals and flying leads, control modules for controlling production trees, completion test trees, blowout preventors, etc. In a preferred embodiment, the barrier fluid is introduced into the entire interior area of the subsurface apparatus. However, in some instances, it is not necessary or practical to fill the entire interior area of the subsurface apparatus. For instance, it is not essential to fill an entire pipeline with the barrier fluid gel. In such cases, the barrier fluid may be present at the end of the pipeline at a distance sufficient to prevent water ingress.

The barrier fluid contains a base fluid and a gellant system. The base fluid may be fresh water, an alcohol or a glycol and blends thereof, and hydrocarbons, such as diesel. The gellant system typically contains a viscosifying polymer, crosslinking agent, buffering agent and activator and may further contain other components used in gels in oilfield applications.

The amount of base fluid in the barrier fluid is typically between from about 90 to 99 volume percent, more typically between from about 95 to about 99 volume percent; the amount of gellant system in the barrier fluid typically being between from about 1 to about 10 volume percent.

The barrier fluid is characterized as having a specific gravity which is substantially similar to the specific gravity of the unwanted fluid. Typically, the gelled barrier fluid has a specific gravity which is ±0.05, preferably ±0.01, most preferably ±0.003, of the specific gravity of the unwanted fluid. Thus, for instance, where the unwanted fluid is seawater having a measured specific gravity of 1.026, the specific gravity of the barrier fluid is typically between 1.015 and 1.035 and more typically between 1.022 and 1.028. Where the unwanted fluid is fresh water, the specific gravity of the barrier fluid is typically between 0.99 and 1.01 and more typically between 0.997 and 1.003.

Since the entrainment of gases may lighten the density of the barrier fluid, the gelled fluids described herein typically are substantially free of gases, such as natural gas, air or nitrogen. In a most preferred embodiment, the barrier fluid does not contain any gas.

Typically, the base fluid is prepared and then the gellant system is added to the base fluid to render the barrier fluid. In such instances, the formation of gas bubbles during all mixing phases is avoided.

Preferably, the specific gravity of the base fluid is adjusted, prior to the addition of the gelling system. In one embodiment of the invention, the specific gravity of the unwanted fluid is first determined. The specific gravity of the components of the gellant system is then subtracted from the specific gravity of the unwanted fluid. The difference is the pre-determined specific gravity of the base fluid. Components of the base fluid and volumetric ratios of the components are then selected such that the pre-determined specific gravity of the base fluid may be attained.

In one embodiment of the invention, the components of the base fluid and the volumetric amounts of the components are chosen such that the base fluid has a specific gravity which is less than the specific gravity of water. The components of the gellant system are then added to the base fluid such that the specific gravity of the resulting barrier fluid is ±0.05 of the specific gravity of the unwanted fluid.

Illustrative of the invention is the situation where the unwanted fluid is fresh water or salt water and the specific gravity of the base fluid is less than the specific gravity of the fresh water or salt water. Upon the addition of the gellant system to the base fluid, the specific gravity of the resulting barrier fluid is within ±0.05 of the specific gravity of the unwanted fluid. In such instances, the base fluid may contain no water or an insignificant amount of water (i.e., less than or equal to 5 volume percent, more typically less than or equal to 1 volume percent)

Suitable alcohols and glycols for use in base fluids are methanol, ethanol, isopropyl alcohol, triethylene glycol, propylene glycol or ethylene glycol or combinations thereof. For instance, the base fluid may be composed of the combination of methanol and ethylene glycol, methanol and propylene glycol, isopropyl alcohol and ethylene glycol and ethanol and triethylene glycol.

In a preferred embodiment of the invention, e.g., where the unwanted material is sea water, the base fluid may be methanol and monoethylene glycol. In such instances, the specific gravity of the base fluid may be between from about 0.85 to about 1.03. For example, the specific gravity of a base fluid of the combination of methanol and ethylene glycol may range from 0.88 (75:25 v/v methanol/polypropylene glycol) to 1.046 ((25:75 v/v monoethylene glycol/methanol). Since the specific gravity of sea water is 1.025, the gellant system selected for addition to the base fluid may be such that the specific gravity of the barrier fluid is not less than 1.015 and not more than 1.035, preferably not less than 1.0247 and not more than 1.028. When the undesired fluid is fresh water, the specific gravity of the barrier fluid may be not less than 0.997 and not greater than 1.003.

The gellant system selected for addition to the base fluid imparts sufficient viscosity upon being crosslinked to be used as a gel plug and is characterized by physical properties which render a barrier fluid having the targeted specific gravity.

Where the base fluid has a specific gravity which is greater than the specific gravity of the unwanted subsurface fluid and the specific gravity is outside of the differential, for instance, the differential is greater than 0.05, it is necessary to reduce the specific gravity of the fluid. For instance, the specific gravity of a base fluid containing a 10/90 v/v methanol/monoethylene glycol blend may be reduced by additional methanol. Illustrative of this aspect of the invention is a base fluid composed of ethylene glycol base fluid (having a specific gravity of 1.115) which is adjusted by the addition of methanol (having a specific gravity of 0.795) such that, upon addition of the components of the gellant system, the specific gravity of the barrier fluid is ±0.05 of the specific gravity of the unwanted fluid.

In some instances, the base fluid contains a weighting agent. For instance, where the undesired fluid is sea water and the fluid chosen for the base fluid is fresh water, it is necessary to increase the specific gravity of the fresh water by combining the fresh water with a weighting agent in order to obtain a specific gravity differential (between the barrier fluid and sea water) of 0.003.

Suitable weighting agents include organic solvents and salts. Suitable organic solvents for increasing the specific gravity of water include glycols, such as ethylene glycol, propylene glycol, polyethylene glycol and polypropylene glycol. Suitable salts include organic salts, such as acetate salts, like sodium acetate, and inorganic salts, such as phosphate salts like disodium hydrogen phosphate. Typically, the amount of water in such base fluids is between from about 90 to 99 volume percent and the amount of weighting agent is between from 1 to 10 volume percent.

When the barrier fluid is prepared on the surface, it is desirable to mimic the in-situ environmental conditions of the undesired fluid such that the specific gravity of the barrier fluid at in-situ conditions approximates (within ±0.05) the specific gravity of the unwanted fluid in-situ. For instance, if the temperature of the unwanted material at in-situ conditions is 38° F., then the specific gravity of the barrier fluid should be within ±0.05 of the specific gravity of the unwanted fluid at 38° F.

The gellant system typically contains a viscosifying polymer and crosslinking agent (forming the crosslinked polymer) and optionally a buffer and/or activator. The gellant is typically added to the base fluid before the gellant system becomes gelled.

The polymer is preferably a synthetic polymer or a polysaccharide. Suitable polysaccharides include guar and guar derivatives and cellulosic derivatives. Exemplary guar derivatives include hydroxypropyl guar, carboxymethylhydroxypropyl guar and carboxymethyl guar. Suitable cellulosic derivatives include carboxymethyl hydroxyethyl cellulose (CMHEC), hydroxyethyl cellulose (HEC) and carboxymethyl cellulose (CMC).

Suitable synthetic polymers include polyacrylates, polymethylacrylates, polyacrylamides, acrylamide methyl propane sulfonic acid copolymers, polyvinyl alcohols, polyvinyl pyrrolidones, and maleic anhydride methyl vinyl ether copolymers and polyethylene oxide.

Suitable crosslinking agents for viscosifying the polymer include borates and borate ion releasing compounds such as boric acid, alkali metal borates such as sodium diborate, potassium tetraborate, sodium tetraborate (borax), pentaborates, alkaline and zinc metal borates. boric oxide (such as selected from $H_3BO_3$ and $B_2O_3$) and polymeric borate compounds. Further, suitable crosslinking agents include organometallic or organic complexed metal ions comprising at least one transition metal or alkaline earth metal ion as well as mixtures thereof, such as Zr (IV) and Ti (IV).

The gellant may further contain an activator. Conventional activators include caustic, alkali halides, ammonium halides, potassium fluoride, dibasic alkali phosphates, tribasic alkali phosphates, ammonium fluoride, tribasic ammonium phosphates, dibasic ammonium phosphates, ammonium bifluoride, sodium fluoride, triethanolamine, alkali silicates and alkali carbonates.

The gellant system may further contain a buffering agent/system. Typically, the pH of the gellant system is between from about 8.5 to 12.0, preferably from 9.5 to 10.5, in order to effectuate borate crosslinking Conventional buffering agents such as potassium carbonate may be employed for this purpose.

In some instances, for example where the subsurface apparatus is composed of stainless steel, the amount of chloride in the gelled barrier fluid is normally less than 50 ppm.

In a preferred embodiment of preparing the barrier fluid, a buffer is first added to the base fluid, followed by the addition of the viscosifying polymer. After hydration, the crosslinking agent is added, optionally with the activator. The pH of the fluid is then raised and crosslinking occurs to render the gelled fluid.

Typically, the gelled barrier fluid is prepared topside and is added to the subsurface apparatus above ground before the subsurface apparatus is placed. This ensures the substantial absence of gas in the subsurface apparatus which would have a detrimental effect on the specific gravity of the barrier fluid. The majority of the crosslinking occurs within the first few minutes from the time that the viscosifying polymer is combined with the crosslinking agent. However, some crosslinking continues after the base fluid and gellant system have been combined as the mixture ages. For instance, some crosslinking may continue to occur for 16 to 24 hours after the viscosifying polymer has been combined with the crosslinking agent.

In one application, a pipe or manifold is filled with the gelled fluid onshore or on the deck of the vessel prior to subsea deployment. Crosslinking may continue to occur after placement of the gelled fluid into the pipe or manifold.

Alternatively, the barrier fluid may be pumped into the subsurface apparatus after the apparatus has been placed into the subsurface. In such instances, the crosslinking agent may be added to the linear gel while the fluid is being introduced into the subsurface apparatus. As an example, maintenance of an existing subsea apparatus tying a subsea apparatus into an existing subsea system may be effectuated by injecting the gelled fluid via a hose or coiled tubing subsea into the subsea apparatus. Depending on the subsurface depth and hose length, a linear gel may be pumped subsea and the crosslinker injected at the point of entry into the pipe where the crosslinked gel is too viscous to inject directly down a long length of hose. In all of such embodiments, measures should be taken to ensure the substantial absence of gas in the subsurface apparatus.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Example 1

A gel plug with minimal water content and having 650 mL of a base fluid of monoethylene glycol (specific gravity, 1.1132) was prepared for a tank containing salt water having a specific gravity, at room temperature (20° C.), of 1.027. The gel plug also contained 10 g of hydroxypropyl guar as gelling agent, 10 mL of a zirconate crosslinking agent, commercially available as XLW-53 from BJ Services Company LLC, 1 mL of a buffer, commercially available as BF-10L from BJ Services Company LLC for maintaining the pH of approximately 5.0 and 40 mL of a 25% weight percent solution of sodium hydroxide in water, as activator.

In light of the higher specific gravity, the base fluid was "lightened" with a lower specific gravity material in order to obtain a fluid having a specific gravity of the salt water. The lower specific gravity material was methanol (specific gravity, 0.7918), which is readily soluble in the glycol. In order to understand the relationship between the mixture ratios of the monoethylene glycol and methanol, a blend was produced (all volumes in ml) and the specific gravities were measured. The results are shown in Table I.

TABLE I

| Methanol | 0 | 25 | 32 | 50 | 75 | 100 |
|---|---|---|---|---|---|---|
| MEG | 100 | 75 | 68 | 50 | 25 | 0 |
| Specific Gravity | 1.115 | 1.046 | 1.025 | 0.968 | 0.88 | 0.795 |

Since the sum of the initial volumes of two dissimilar liquids may not necessarily match the observed measured volume of the blended material, the volume reductions of the blend, set forth in Table II, was determined:

TABLE II

| Methanol | 0 | 25 | 32 | 50 | 75 | 100 |
|---|---|---|---|---|---|---|
| MEG | 100 | 75 | 68 | 50 | 25 | 0 |
| Measured Volume | 100 | 97 | 97 | 98 | 97 | 100 |

The volume reductions may be attributable to the squeezing, at the molecular level, of the smaller molecules (methanol) such that they fill the voids between the relatively larger molecules (MEG).

To determine the target specific gravity of the mixed methanol and monoethylene glycol base fluid, the contribution of gelling agent and buffer and the contribution of crosslinking agent and activator were subtracted from the final crosslinked gel. In order to do this, the combination of the gelling agent and the buffer was determined to contribute 0.002 specific gravity units to the base fluid, whereas the combination of the crosslinking agent and activator was determined to add 0.016 specific gravity units to the base fluid. The target specific gravity value for the methanol and monoethylene glycol blended base fluid was determined to be 1.009:

$$1.027-(0.002+0.016)=1.009.$$

The necessary mix ratio of methanol to monoethylene glycol was determined and a blended base fluid having a specific gravity of 1.009 was then prepared.

Once the base fluid was prepared having a specific gravity of 1.009, the gelling agent and hydration assisting buffer were added and thoroughly mixed. The gelling agent was then allowed to hydrate. The crosslinker was then added and thoroughly mixed into the base fluid/gelling agent mixture. The activator was subsequently added and mixed. The gel having the defined specific gravity was then available to be pumped or placed in the apparatus, pipe or pipe spool of interest.

Example 2

Water based crosslinked gels modified with glycols were examined for specific gravity modification. The water based crosslinked gel was hydroxypropyl guar (commercially available as GW-32 from BJ Services Company LLC) at a rate of 100 pounds of gel per 1000 gallons of water. The specific gravity of the mix was adjusted by the addition of a glycol, namely monoethylene glycol. The mixing procedure for this gel was as follows:

1. mix water/glycol to specific gravity 1.020 (water blend);
2. add BF-10L, XLW-4 (water blend) (XLW-4 is sodium tetraborate tetrahydrate in glycerol, commercially available from BJ Services Company LLC);
3. add water blend to jar (¾) full;
4. slowly add GW-32 slurry (13.12 g GW-32 in 20 ml of selected glycol);
5. add remaining water blend;
6. allow to hydrate 15 minutes;
7. add BF-7L buffering agent, a product of BJ Services Company LLC;
8. allow to crosslink for 10 minutes.

The specific gravity of the blend and the specific gravity during the mixing are set forth in Tables III for a monoethylene glycol containing blend:

TABLE III

| Component | Amount | Specific Gravity |
|---|---|---|
| Water/glycol | 968 mL | |
| MEG | 142 mL | 1.020 |
| BF-10L | 1.07 mL | |
| XLW-4 | 7.67 mL | |
| GW-32 Slurry | 13.12 g | |
| BF-7L | 3.14 mL | 1.025 |

From the foregoing, it will be observed that numerous variations and modifications may be effected without departing from the true spirit and scope of the novel concepts of the invention.

What is claimed is:

1. A method of preventing ingress of an unwanted subsurface fluid into a subsurface apparatus which comprises introducing into the entire interior of the subsurface apparatus prior to introducing the subsurface apparatus to the subsurface a barrier fluid comprising a base fluid and a gellant system wherein the amount of base fluid in the barrier fluid is between from about 90 to about 99 volume percent wherein the barrier fluid, at subsurface environmental conditions, has a specific gravity within 0.01 of the specific gravity of the unwanted fluid.

2. The method of claim 1, wherein the specific gravity of the barrier fluid is within 0.003 of the specific gravity of the unwanted fluid.

3. The method of claim 1, wherein the subsurface apparatus is a pipe, pipeline, manifold or spool.

4. The method of claim 1, wherein the amount of chloride in the barrier fluid is less than 50 ppm.

5. The method of claim 1, wherein the unwanted fluid is fresh water, seawater or a hydrocarbon.

6. The method of claim 1, wherein the barrier fluid is substantially free of a gas.

7. The method of claim 6, wherein the barrier fluid does not contain a gas.

8. The method of claim 1, wherein the gellant system contains a viscosifying polymer and a crosslinking agent.

9. The method of claim 8, wherein the base fluid contains fresh water or a hydrocarbon.

10. The method of claim 8, wherein the base fluid contains the combination of an alcohol and glycol.

11. The method of claim 10, wherein the base fluid contains one of the following groups:
    (a) methanol and ethylene glycol;
    (b) methanol and propylene glycol;
    (c) ethanol and ethylene glycol; and
    (d) ethanol and propylene glycol.

12. The method of claim 8, wherein the base fluid contains a weighting agent.

13. The method of claim 12, wherein the weighting agent is a salt selected from the group consisting of an acetate and a dialkali hydrogen phosphate.

14. A method of preventing ingress of an unwanted subsurface fluid into a subsurface apparatus wherein the unwanted subsurface fluid is selected from the group consisting of fresh water, seawater and crude oil, the method comprising introducing into the subsurface apparatus a gelled barrier fluid wherein the barrier fluid, at subsurface conditions, has a specific gravity which is within 0.01 of the specific gravity of the unwanted subsurface fluid and wherein the entire interior area of the apparatus, after being filled with the gelled barrier fluid, is free of a gas.

15. The method of claim 14, wherein the gelled barrier fluid is prepared by first preparing a base fluid having a specific gravity less than the unwanted subsurface fluid and then introducing to the base fluid a gellant comprising a viscosifying polymer and crosslinking agent.

16. The method of claim 14, wherein the gelled barrier fluid is added to the subsurface apparatus above ground and before the apparatus is placed in the subsurface.

17. A method of preventing ingress of an unwanted subsurface fluid into a subsurface apparatus which comprises introducing into the entire interior of the subsurface apparatus a gelled barrier fluid wherein the barrier fluid, at subsurface environmental conditions, has a specific gravity within 0.01 of the specific gravity of the unwanted fluid and further wherein the barrier fluid is pumped into the subsurface apparatus after the subsurface apparatus has been placed into the subsurface.

18. The method of claim 17, wherein the gelled barrier fluid is prepared from a base fluid having a specific gravity less than the unwanted subsurface fluid, a viscosifying polymer and a crosslinking agent and further wherein the crosslinking agent is added to the viscosifying polymer to form a crosslinked polymer while the base fluid is being introduced into the subsurface apparatus.

19. The method of claim 18, wherein the crosslinked polymer is a crosslinked cellulosic derivative or guar derivative.

* * * * *